US005489170A

United States Patent [19]

Inoue et al.

[11] Patent Number: 5,489,170

[45] Date of Patent: Feb. 6, 1996

[54] ANCHORING APPARATUS FOR WHEELED CHAIR

[75] Inventors: Hiroaki Inoue; Hiroshi Orito, both of Aichi, Japan

[73] Assignee: Araco Kabushiki Kaisha, Aichi, Japan

[21] Appl. No.: 163,865

[22] Filed: Dec. 9, 1993

[30] Foreign Application Priority Data

Dec. 16, 1992 [JP] Japan .................................... 4-336175

[51] Int. Cl.[6] ............................... A61G 5/00; A61G 3/08; B60P 7/08; B60P 3/06

[52] U.S. Cl. .................................... 410/7; 410/51; 410/4; 296/63; 296/65.1

[58] Field of Search .................................. 410/3, 4, 7, 9, 410/23, 51; 296/63, 65.1; 297/DIG. 4; 280/250.1, 304.1; 180/907; 188/2 F, 32; 248/503, 503.1

[56] References Cited

U.S. PATENT DOCUMENTS

| | | | |
|---|---|---|---|
| 4,389,056 | 6/1983 | Tenniswood | 410/23 X |
| 4,407,616 | 10/1983 | Hinze | 410/3 |
| 4,457,551 | 7/1984 | Anthony | 410/51 X |
| 4,623,289 | 11/1986 | Apostolos | 410/51 X |
| 4,730,964 | 3/1988 | Joyner | 280/304.1 X |
| 4,773,693 | 9/1988 | Premji et al. | 296/65.1 |
| 4,973,022 | 11/1990 | Mayland | 248/503.1 |

FOREIGN PATENT DOCUMENTS

| | | | |
|---|---|---|---|
| 3423646 | 1/1986 | Germany | 410/4 |
| 57-25219 | 5/1982 | Japan . | |
| 61-10267 | 1/1986 | Japan . | |
| 62-99229 | 6/1987 | Japan . | |
| 1-136657 | 5/1989 | Japan . | |
| 2-28229 | 2/1990 | Japan . | |
| 2-141563 | 11/1990 | Japan . | |

*Primary Examiner*—Frank E. Werner
*Assistant Examiner*—Stephen Gordon
*Attorney, Agent, or Firm*—Fisher & Associates

[57] ABSTRACT

An anchoring apparatus for a wheeled chair mainly composed of a movable frame assembled with a seat frame structure of the wheeled chair to be movable in a vertical direction, a hydraulic damper assembled with the seat frame structure for biasing the movable frame upwardly to retain the movable frame in a lifted position in a released condition of the anchoring apparatus, a foot pedal mechanism having a foot pedal assembled with the seat frame structure of the wheeled chair to lower the movable frame when depressed by an attendant, a locking mechanism mounted on the movable frame to be locked by engagement with a stationary element fixed to a floor when the movable frame has been lowered by depression of the foot pedal, and a releasing mechanism assembled with the seat frame structure of the wheeled chair, the releasing mechanism having an operation lever mounted on a back frame structure of the wheeled chair and operatively connected to the locking mechanism to release engagement of the locking mechanism with the stationary element when operated by the attendant.

23 Claims, 5 Drawing Sheets

ANCHORING APPARATUS FOR WHEELED CHAIR

BACKGROUND OF THE INVENTION

1. Field of the Invention

The present invention relates to an anchoring apparatus for a wheeled chair which is suitable for anchoring the wheeled chair on a floor such as the floor of a vehicle compartment.

2. Description of the Prior Art

Various anchoring apparatus for a wheeled chair have been proposed for anchoring the wheeled chair on the floor of a vehicle compartment or the like while a person is seated on the wheeled chair. Although the most important function of such anchoring apparatus is to securely and firmly anchor the wheeled chair on the floor, the following are also important requirements. Namely, operation by an attendant for locking and releasing the wheeled chair must be simple and easy, the structure of the anchoring apparatus should not be complex, and the wheeled chair can be anchored at desired places. To meet these requirements, an improved anchoring apparatus for wheeled chairs has been proposed in Japanese Utility Model Laid-open Publication No. 2-141563.

However, since the proposed anchoring apparatus is designed to be installed on a floor at which a wheeled chair is to be anchored, the wheeled chair can be anchored only at a specific place where the anchoring apparatus is installed. In a case in which the wheeled chair must be anchored at various places, the anchoring apparatus must be installed at the respective places. Accordingly, the conventional anchoring apparatus is not economical in view of costs for the anchoring apparatus and installation thereof.

SUMMARY OF THE INVENTION

An object of the present invention is to provide an improved anchoring apparatus for a wheeled chair capable of anchoring the wheeled chair at various places on a floor in a simple manner.

Another object of the present invention is to provide an improved anchoring apparatus for a wheeled chair which can be assembled with the wheeled chair in a simple construction.

A further object of the present invention is to provide an improved anchoring apparatus for a wheeled chair which is economically advantageous in terms of installation cost.

According to the present invention, the objects are accomplished by providing an anchoring apparatus for a wheeled chair, which comprises a movable frame assembled with a seat frame structure of the wheeled chair to be movable in a vertical direction; means for biasing the movable frame upwardly to retain the movable frame in a lifted position in a released condition of the anchoring apparatus; a foot pedal mechanism having a foot pedal assembled with the seat frame structure of the wheeled chair to lower the movable frame when depressed by an attendant; a locking mechanism mounted on the movable frame to be locked by engagement with a stationary element fixed to a floor when the movable frame has been lowered by depression of the foot pedal; and a releasing mechanism assembled with the seat frame structure of the wheeled chair, the releasing mechanism including an operation lever mounted on a back frame structure of the wheeled chair and operatively connected to the locking mechanism to release engagement of the locking mechanism with the stationary element when operated by the attendant.

In a practical embodiment of the present invention, it is preferable that a support frame is mounted on the seat frame structure of the wheeled chair and located above the movable frame, wherein a link mechanism is assembled with the support frame and the movable frame to carry the movable frame thereon for vertical movement. It is also preferable that the support frame has a pair of laterally spaced parallel first side members each of which is formed with an elongated guide slot at a position adjacent to its one end, and the movable frame has a pair of laterally spaced parallel second side members each of which is formed with an elongated guide slot at a position adjacent to its one end, wherein the link mechanism includes a pair of laterally spaced first link members pivoted at their one ends to the other ends of the first side members and at their other ends to first support pins slidably engaged with the guide slots of the second side members and a pair of laterally spaced second link members pivoted at their one ends to the other ends of the second side members and at their other ends to second support pins slidably engaged with the guide slots of the first side members, the first link members being pivoted to the second link members at their central portions, respectively.

In such an arrangement of the link mechanism, it is preferable that the biasing means comprises a pair of laterally spaced dampers each having a cylinder and a piston rod, the cylinders being pivoted to the other ends of the first side members, while the piston rods being pivoted to the first support pins, respectively.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
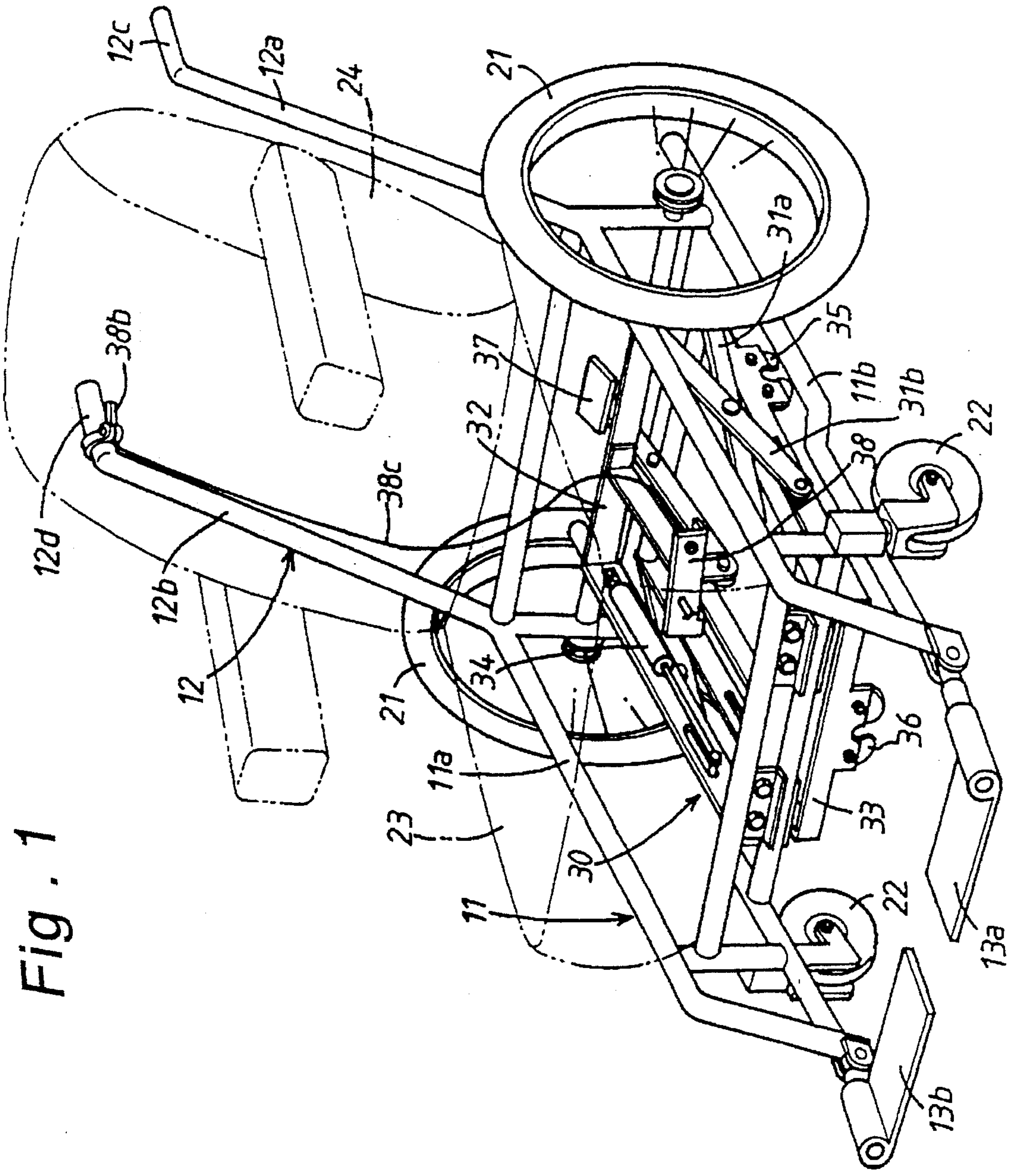
FIG. 1 is a perspective view of a wheeled chair equipped with an anchoring apparatus according to the present invention.
Figure 2:
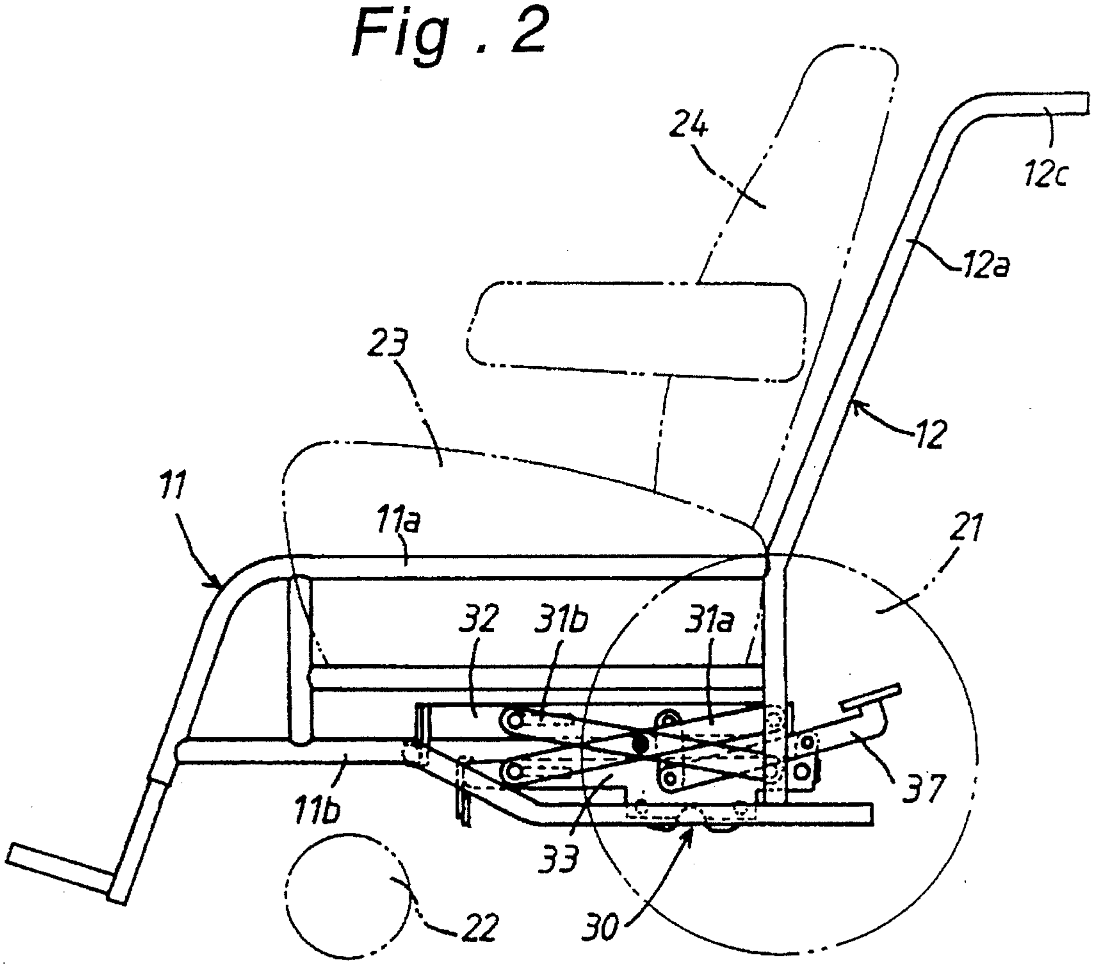
FIG. 2 is a schematic side view of the wheeled chair shown in FIG. 1.
Figure 3:
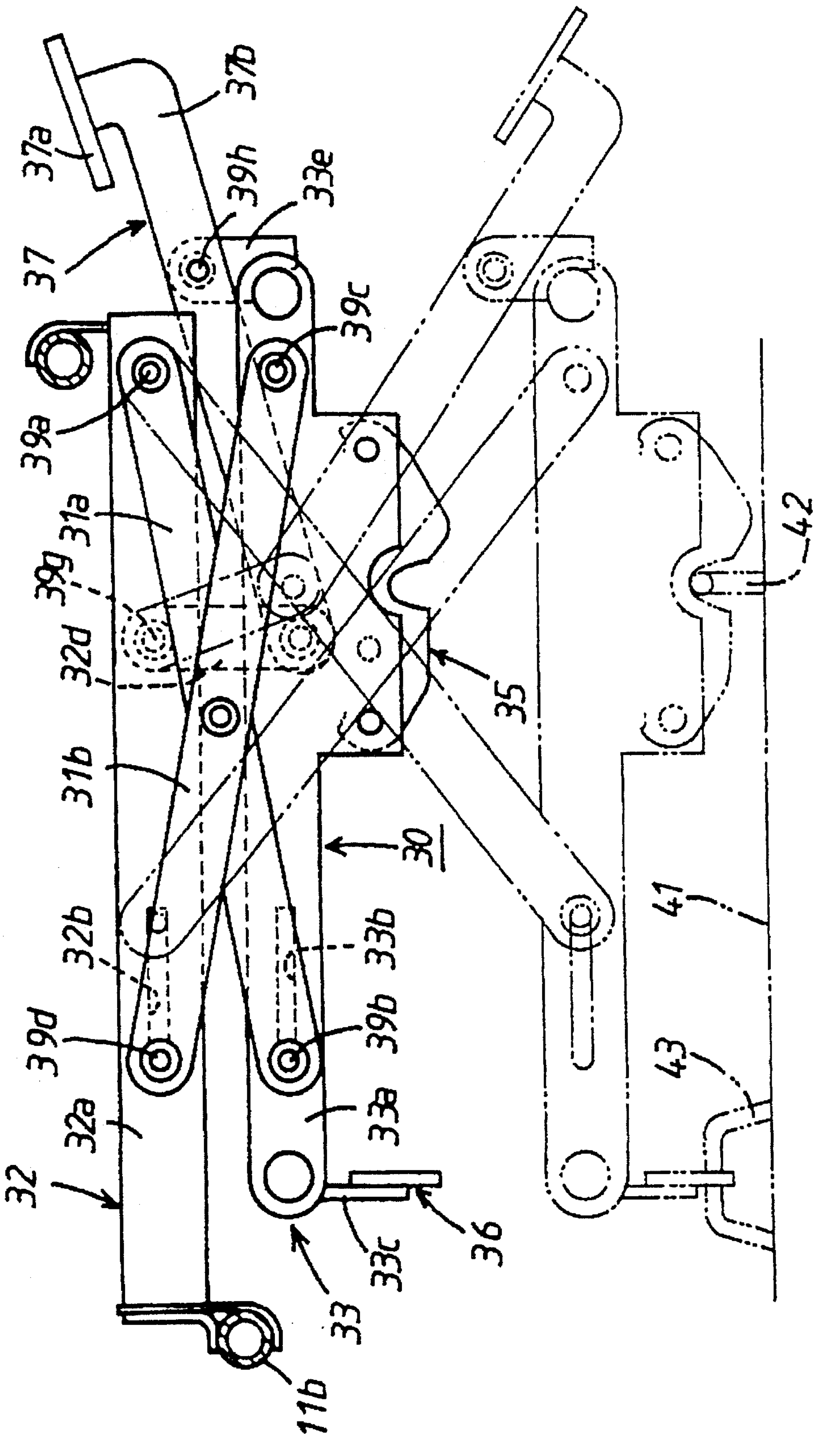
FIG. 3 is an enlarged side view of the anchoring apparatus shown in FIG. 1.
Figure 4:
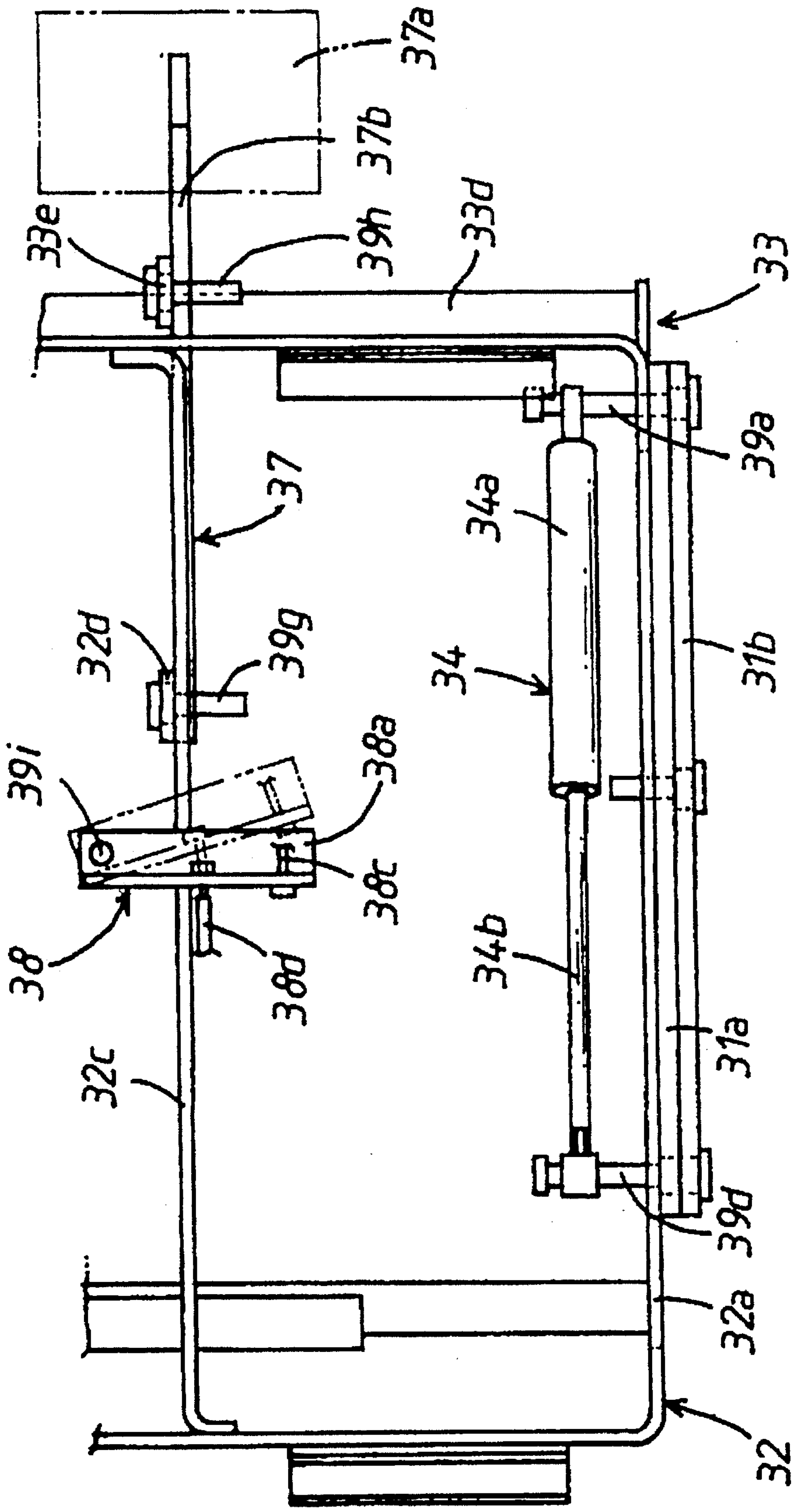
FIG. 4 is a partial plan view of the anchoring apparatus.
Figure 5:
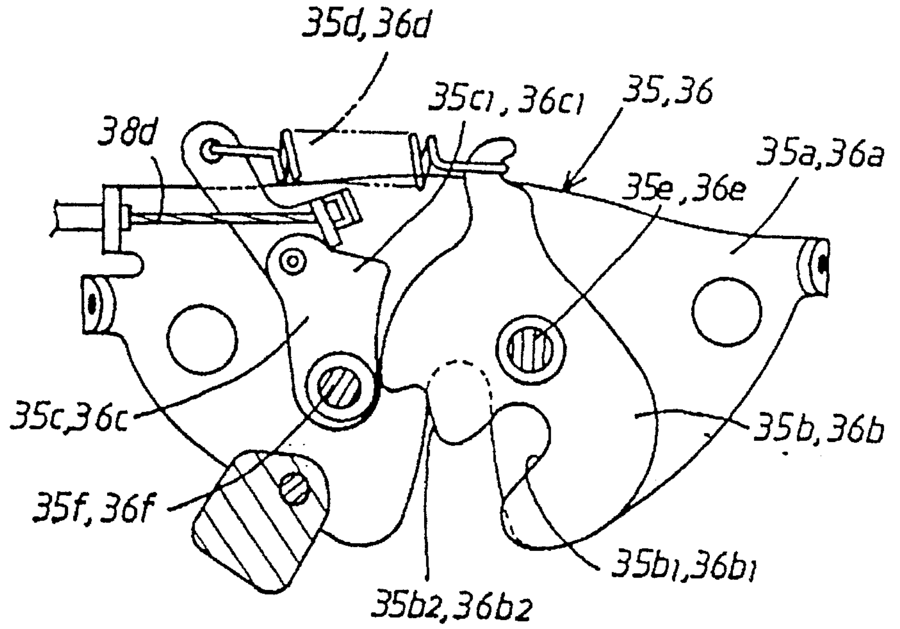
FIG. 5 is an enlarged side view of a locking mechanism of the anchoring apparatus in a released condition.
Figure 6:
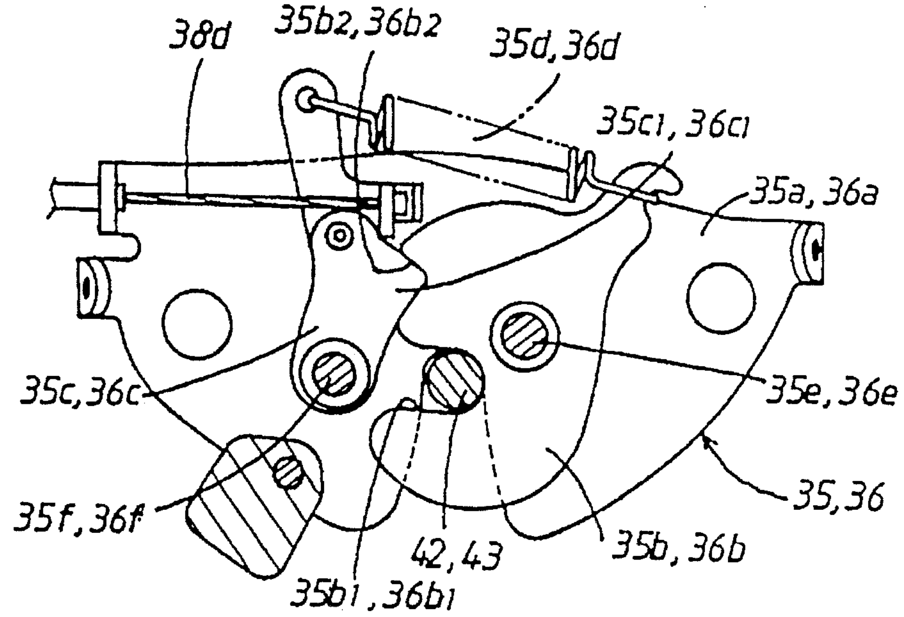
FIG. 6 is an enlarged side view of the locking mechanism of the anchoring apparatus in a locked condition.

An embodiment of the present invention will now be described in detail with reference to the drawings, in which FIGS. 1 and 2 schematically illustrate a wheeled chair equipped with an anchoring apparatus 30 according to the present invention, FIGS. 3 and 4 illustrate the anchoring apparatus 30 in relation to a seat frame structure 11 of the wheeled chair, and FIGS. 5 and 6 illustrate the mode of operation of locking mechanisms 35, 36 of the anchoring apparatus 30.

The wheeled chair is mainly composed of the seat frame structure 11, a back frame structure 12, a pair of rear wheels 21, a pair of front wheels 22, a seat cushion 23 and a seat back 24. The anchoring apparatus 30 is located under the seat frame structure 11 and assembled therewith. The seat frame structure 11 is composed of upper and lower frames 11*a* and 11*b* which are spaced in a vertical direction and unitedly connected with each other. The seat cushion 23 is detachably placed on and fixed to the upper frame 11*a*. The back frame structure 12 is composed of left-hand and right-hand upstanding frame rods 12*a* and 12*b* which are secured at their lower ends to the rear end of upper frame 11*a* and inclined backwardly. The upstanding frame rods 12*a* and 12*b* are integrally formed at their upper ends with horizontal grip portions 12*c* and 12*d* which are adapted as an operation portion of an attendant. The seat back 24 is detachably fixed to the back frame structure 12. The seat frame structure 11 is carried at Its rear end by means of the rear wheels 21 and at its front end portions by means of the front wheels 22. In addition, the seat frame structure 11 is provided at its front end with a pair of foot-rests 13*a* and 13*b*.

As shown in FIGS. 3 and 4, the anchoring apparatus 30 is composed of a pair of laterally spaced first link members 31*a*, 31*a*, a pair of laterally spaced second link members 31*b*, 31*b*, an upper support frame 32, a lower movable frame 33, a pair of laterally spaced hydraulic dampers 34 a pair of laterally spaced side locking mechanisms 35, 35, a front locking mechanism 36, a foot pedal assembly 37 and a releasing mechanism 38. The upper support frame 32 is formed to correspond in configuration with the lower frame 11*b* of the seat frame structure 11 and is fixedly mounted on the lower frame 11*b*. (see FIG. 2) As shown in FIGS. 3 and 4, the upper support frame 32 has a pair of laterally spaced parallel side members 32*a* each of which is formed with an elongated guide slot 32*b* in a fore-and-aft direction at a forwardly offset position thereof. The lower movable frame 33 is formed slightly smaller in size than the upper support frame 32. The lower movable frame 33 is located under the upper support frame 32 and is connected to the side members 32*a* of upper support frame 32 by means of the link members 31*a* and 31*b*. The lower movable frame 33 has a pair of laterally spaced parallel side members 33*a* each of which is formed with an elongated guide slot 33*b* in a fore-and-aft direction at a forwardly offset position thereof.

The pair of first link members 31*a*, 31*a* are pivoted at their rear ends to the rear ends of upper side members 32*a*, 32*a* by means of support pins 39*a*, 39*a* and are rotatably carried on support pins 39*b*, 39*b* at their front ends. The support pins 39*b*, 39*b* are slidably engaged with the guide slots 33*b*, 33*b* of lower side members 33*a*, 33*a* for movement in the fore-and-aft direction. The pair of second link members 31*b*, 31*b* are pivoted at their rear ends to the rear ends of lower side members 33*a*, 33*a* by means of support pins 39*c*, 39*c* and are rotatably carried on support pins 39*d*, 39*d* at their front ends. The support pins 39*d*, 39*d* are slidably engaged with the guide slots 32*b*, 32*b* of upper side members 32*a*, 32*a* for movement In the fore-and-aft direction. In addition, the first link members 31*a*, 31*a* are pivotally connected to the second link members 31*b*, 31*b* at their central portions, respectively.

Each of the hydraulic dampers 34, 34 has a cylinder 34*a* and a piston rod 34*b*. As shown in FIG. 4, the cylinders 34*a* are rotatably supported on the support pins 39*a*, 39*a* respectively at their rear ends to be movable in a vertical direction. The piston rods 34*b*, 34*b* are rotatably carried by the support pins 39*d*, 39*d* respectively at their front ends to be movable in a vertical direction. In the above arrangement of the hydraulic dampers 34, 34, the support pins 39*d*, 39*d* are maintained in engagement with the front ends of guide slots 32*b*, 32*b* under the biasing force of dampers 34, 34 so that the lower movable frame 33 is retained in a lifted position by means of the link members 31*a* and 31*b* as shown in FIG. 3. When the lower movable frame 33 is lowered by a depression force applied thereto, the support pins 39*d*, 39*d* are moved rearwardly against the biasing force of dampers 34, 34.

The locking mechanisms 35 and 36 are substantially the same in construction. As shown in FIGS. 1 and 3, the pair of side locking mechanisms 35, 35 are mounted on the side members 33*a*, 33*a* of lower movable frame 33 at their inside faces, while the front locking mechanism 36 is mounted on a front lateral member 33*c* of lower movable frame 33 at its inside face. As shown in FIGS. 5 and 6, the locking mechanisms 35, 36 are composed of base plates 35*a*, 36*a* respectively secured to the lower movable frame 33, detent plates 35*b*, 36*b* respectively pivoted to the base plates 35*a*, 36a by means of support pins 35*c*, 36*e*, locking levers 35*c*, 36*c* respectively pivoted to the base plates 35*a*, 36*a* by means of support pins 35*f*, 36*f* and coil springs 35*d*, 36*d* respectively engaged at their opposite ends with the detent plates 35*b*, 36*b* and locking levers 35*c*, 36*c*.

The detent plates 35*b*, 36*b* are formed with hook portions $\mathbf{35}_{b1}$, $\mathbf{36}_{b1}$ and recessed portions $\mathbf{35}_{b2}$, $\mathbf{36}_{b2}$, respectively. The locking levers 35*c*, 36*c* are respectively formed with protrusions $\mathbf{35}_{c1}$, $\mathbf{36}_{c1}$ to be engaged with the recessed portions $\mathbf{35}_{b2}$, $\mathbf{36}_{b2}$ of detent plates 35, 36. The coil springs 35*d*, 36*d* are engaged at their one ends with each upper end of detent plates 35*b*, 36*b* and at their other ends with each upper end of locking levers 35*c*, 36*c* to bias the detent plates 35*b*, 36*b* and locking levers 35*c*, 36*c* in opposite directions to one another. Thus, in each released condition of the locking mechanisms 35, 36, the hook portions $\mathbf{35}_{b1}$, $\mathbf{36}_{b1}$ of detent plates 35*b*, 36*b* are directed to open downwardly under the biasing force of coil springs 35*d*, 36*d*, and the protrusions $\mathbf{35}_{c1}$, $\mathbf{36}_{c1}$ of locking levers 35*c*, 36*c* are positioned apart from the recessed portions $\mathbf{35}_{b2}$, $\mathbf{36}_{b2}$ of detent plates 35*b*, 36*b* as shown in FIG. 5. When the hook portions $\mathbf{35}_{b1}$, $\mathbf{36}_{b1}$ of detent plates 35*b*, 36*b* are brought into engagement with strikers 42, 43 fixedly mounted on the floor 41 of a vehicle compartment as shown in FIGS. 3 and 6, the protrusions $\mathbf{35}_{c1}$, $\mathbf{36}_{c1}$ of locking levers 35*c*, 36*c* are engaged with the recessed portions $\mathbf{35}_{b2}$, $\mathbf{36}_{b2}$ of detent plates 35*b*, 36*b* and maintained in engagement therewith under the biasing force of coil springs 35*d*, 36*d* in each locked condition of the locking mechanisms 35, 36.

As shown in FIGS. 3 and 4, the foot pedal mechanism 37 includes a foot pedal 37*a* fixed to the rear end of a pedal arm 37*b*. As shown in FIG. 4, the upper support frame 32 is provided with a center beam 32*c* which extends in the fore-and-aft direction at the centeral portion of support frame 32. A link member 32*d* is rotatably connected at its upper end to an intermediate portion of center beam 32*c* by means of a support pin 39*g* and at its lower end to the front end of pedal arm 37*b* to be swingable in a vertical direction. The pedal arm 37*b* is rotatably carried on an upright bracket 33*e* at Its intermediate portion by means of a support pin 39*h* to be swingable In a vertical direction. The upright bracket 33*e* is fixedly mounted on a rear lateral member 33*d* of the lower movable frame 33.

As shown in FIGS. 1 and 4, the releasing mechanism 38 includes a swing arm 38*a*, an operation lever 38*b*, a first operation wire 38*c* and a second operation wire 38*c*. The swing arm 38*a* is pivoted at its one end to a lateral bracket (not shown) by means of a support pin 391 to be swingable in the fore-and aft direction. The lateral bracket is fixedly mounted on the center beam 32*c* for support of the swing arm 38*a*. As shown in FIG. 1, the operation lever 38*b* is mounted on the grip portion 12*d* of the right-hand back frame 12*b* to be operated by an attendant. The first operation wire 38*c* is connected at its one end to the operation lever 38*b* and at its other end to the movable end of swing arm 38*a*, while the second operation wire 38*d* is connected at its one end to an intermediate portion of swing arm 38*a* and at its other end to the respective locking levers 35*c*, 36*c* of the locking mechanisms 35, 36, as shown in FIG. 5.

Assuming that the wheeled chair is in an unlocked condition, the lower movable frame 33 is retained in the lifted position under the biasing force of dampers 34, 34, as shown in FIGS. 1 and 2. In such a condition, the locking mechanisms 35, 36 are maintained in their unlocked conditions as shown in FIG. 5 to permit free movement of the wheeled chair, and the hook portions $35_{b1}$, $36_{b1}$ of detent plates 35*b*, 36*b* are directed to open downwardly. When the attendant wishes to anchor the wheeled chair on the floor 41 of the vehicle compartment, the wheeled chair is placed at a predetermined position so that the locking mechanisms 35, 36 are located above the strikers 42, 43 on the floor. When the foot pedal 37*a* is depressed by the attendant, the lower movable frame 33 is lowered by downward movement of the pedal arm 37*b* against the biasing force of dampers 34, 34 to bring the detent plates 35*b*, 36*b* of the locking mechanisms 35, 36 into engagement with the strikers 42, 43 at their hook portions $35_{b1}$, $36_{b1}$. In this instance, as shown in FIG. 6, the detent plates 35*b*, 36*b* are rotated clockwisely by abutment with the strikers 42, 43 against the biasing force of coil springs 35*d*, 36*d*, while the locking levers 35*c*, 36*c* are rotated clockwisely due to the action of coil springs 35*d*, 36*d*. As a result, the protrusions $35_{c1}$, $36_{c1}$ of locking levers 35*c*, 36*c* are engaged with the recessed portions $35_{b2}$, $36_{b2}$ of detent plates 35*b*, 36*b* and maintained in engagement therewith under the biasing force or coil springs 35*d*, 36*d* to prohibit rotation of the detent plates 35*b*, 36*b* and locking levers 35*c*, 36*c*. Thus, the detent plates 35*b*, 36*b* are locked by engagement with the strikers 42, 43 to securely and firmly anchor the wheeled chair on the floor 41.

When it is desired to release the wheeled chair from the anchored condition, the operation lever 38*b* of the releasing mechanism 38 is operated by the attendant so that the first operation wire 38*c* is pulled to rotate the swing arm 38*a* backwardly. In turn, the second operation wire 38*d* is pulled by backward rotation of the swing arm 38*a* to rotate the locking levers 35*c*, 36*c* of the locking mechanisms 35, 36 counterclockwisely in FIG. 6. As a result, the protrusions $35_{c1}$, $36_{c1}$ of locking levers 35*c*, 36*c* are disengaged from the recessed portions $35_{b2}$, $36_{b2}$ of detent plates 35*b*, 36*b*, and the detent plates 35*b*, 36*b* are rotated counterclockwisely by the biasing force of coil springs 35*d*, 36*d* to release the hook portions $35_{b1}$, $36_{b1}$ of detent plates 35*b*, 36*b* from the strikers 42, 43. After the detent plates 35*b*, 36*b* are released from the strikers 42, 43, the lower movable frame 33 is lifted by the biasing force of dampers 34, 34, and the locking mechanisms 35, 36 are lifted with the lower movable frame 33 to release the wheeled chair from the floor 41 so as to permit free movement of the wheeled chair.

From the above description, it will be understood that with the anchoring apparatus 30 according to the present invention. the wheeled chair can be securely and firmly anchored to the floor by depression of the foot pedal 37 and can be released from the floor by operation of the operation lever 38*b* of the releasing mechanism 38. It will be also understood that since the anchoring apparatus 30 is assembled with the wheeled chair, the wheeled chair can be anchored at any places where the strikers 42, 43 are provided for engagement with the locking mechanisms 35, 36. As the strikers 42, 43 are simple in construction, the anchoring apparatus according to the present invention is economically advantageous in terms of installation cost even in a case in which many strikers are provided at various places.

What is claimed is:

1. An anchoring apparatus for a wheeled chair having a seat frame structure, said anchoring apparatus comprising:

a movable frame connectable to said seat frame structure and movable in a vertical direction, with substantially no horizontal component of movement, relative to said seat frame structure;

means for biasing said movable frame upwardly to retain said movable frame in a lifted position when said anchoring apparatus is in a released condition;

a foot pedal mechanism having a foot pedal connectable to said seat frame structure to lower said movable frame when depressed by an attendant; a locking mechanism mounted on said movable frame to be locked by engagement with a stationary element fixed to a floor when said movable frame has been lowered by depression of said foot pedal;

a releasing mechanism having an operation lever operatively connected to said locking mechanism to release engagement of said locking mechanism with said stationary element when operated by said attendant;

wherein said movable frame may be displaced vertically with respect to said stationary element thereby allowing said locking mechanism to connectably engage said movable frame and said stationary element without contacting said seat frame structure.

2. An anchoring apparatus as claimed in claim 1, further comprising:

a support frame connectable to said seat frame structure and located above said movable frame, and a link mechanism assembled with said support frame and said movable frame for carrying said movable frame thereon for vertical movement.

3. An anchoring apparatus as claimed in claim 2, wherein said support frame has a pair of laterally spaced first side members each of which is formed with an elongated guide slot at a position adjacent to its one end, and said movable frame has a pair of laterally spaced parallel second side members each of which is formed with an elongated guide slot at a position adjacent to its one end, and wherein said link mechanism includes a pair of laterally spaced first link members pivoted at their one ends to said other ends of said first side members and at their other ends to first support pins slidably engaged with said guide slots of said second side members and a pair of laterally spaced second link members pivoted at their one ends to said other ends of second side members and at their other ends to second support pins slidably engaged with said guide slots of said first side members, said first link members being pivoted to said second link members at their central portions, respectively.

4. An anchoring apparatus as claimed in claim 3, wherein said biasing means comprises a pair of laterally spaced dampers each having a cylinder and a piston rod, said cylinders being pivoted to the other ends of said first side members, and the piston rods being pivoted to the second support pins.

5. An anchoring apparatus as claimed in claim 1, wherein said locking mechanism comprises a base plate secured to said movable frame, a detent plate pivoted at its central portion to said base plate, a locking lever pivoted at one end to said base plate, and a spring connected at its one end with a movable end of said detent plate and at its other end with a movable end of said locking lever to bias said detent plate and said locking lever in opposite rotational directions to one another, and wherein said detent plate is formed with a recessed portion and a hook portion to be engaged with said stationary element on the floor, and said locking lever is formed with a protrusion to be engaged with the recessed portion of said detent plate and is operatively connected to said operation lever.

6. An anchoring apparatus as claimed in claim 1, wherein said stationary element is a striker fixed to the floor.

7. An anchoring apparatus as claimed in claim 1, wherein said foot pedal is mounted on one end of a pedal arm pivotally carried by said movable frame at its intermediate portion and connectable at its other end to the seat frame structure .

8. A wheeled chair comprising:

a seat frame structure for supporting a seat;

an anchoring apparatus, attached to said seat frame structure, for anchoring said wheeled chair to a stationary element fixed to a floor, said anchoring apparatus comprising:

a movable frame connected to said seat frame structure and movable in a vertical direction relative to said seat frame structure;

means for biasing said movable frame upwardly to retain said movable frame in a lifted position when said anchoring apparatus is in a released condition;

a foot pedal mechanism having a foot pedal connected to said seat frame structure to lower said movable frame when depressed by an attendant;

a locking mechanism mounted on said movable frame to be locked by engagement with said stationary element fixed to said floor when said movable frame has been lowered by depression of said foot pedal; and a releasing mechanism having an operation lever operatively connected to said locking mechanism to release engagement of said locking mechanism with said stationary element when operated by the attendant.

9. The wheeled chair as claimed in claim 8, wherein said anchoring mechanism further comprises:

a support frame mounted on said seat frame structure and located above said movable frame, and a link mechanism assembled with said support frame and said movable frame to carry said movable frame thereon for vertical movement.

10. The wheeled chair as claimed in claim 8, wherein said stationary element is a striker fixed to the floor.

11. The wheeled chair as claimed in claim 8, wherein said foot pedal is mounted on one end of a pedal arm pivotally carried by said movable frame at its intermediate portion and connectable at its other end to said seat frame structure.

12. A wheeled chair comprising:

a seat frame structure for supporting a seat;

an anchoring apparatus, attached to said seat frame structure, for anchoring said wheeled chair to a stationary element fixed to a floor, said anchoring apparatus further comprising:

a movable frame connected to said seat frame structure and movable in a vertical direction;

means for biasing said movable frame upwardly to retain said movable frame in a lifted position when said anchoring apparatus is in a released condition;

a foot pedal mechanism having a foot pedal connected to said seat frame structure to lower said movable frame when depressed by an attendant;

a locking mechanism mounted on said movable frame to be locked by engagement with a stationary element fixed to said floor when said movable frame has been lowered by depression of said foot pedal;

a releasing mechanism having an operation lever operatively connected to said locking mechanism to release engagement of said locking mechanism with said stationary element when operated by said attendant;

a support frame mounted on said seat frame structure and located above said movable frame, and a link mechanism assembled with said support frame and said movable frame to carry said movable frame thereon for vertical movement, wherein said support frame has a pair of laterally spaced first side members each of which is formed with an elongated guide slot at a position adjacent to its one end, and said movable frame has a pair of laterally spaced parallel second side members each of which is formed with an elongated guide slot at a position adjacent to its one end, and wherein said link mechanism includes a pair of laterally spaced first link members pivoted at their one ends to said other ends of said first side members and at their other ends to first support pins slidably engaged with said guide slots of said second side members and a pair of laterally spaced second link members pivoted at their one ends to said other ends of second side members and at their other ends to second support pins slidably engaged with said guide slots of said first side members, said first link members being pivoted to said second link members at their central portions, respectively; and wherein said movable frame may be displaced vertically with respect to said stationary element thereby allowing said locking mechanism to connectably engage said movable frame and said stationary element without contacting said seat frame structure.

13. The wheeled chair as claimed in claim 12, wherein said biasing means comprises a pair of laterally spaced dampers each having a cylinder and a piston rod, said cylinders being pivoted to the other ends of said first side members, and the piston rods being pivoted to the second support pins.

14. A wheeled chair comprising:

a seat frame structure for supporting a seat;

an anchoring apparatus, attached to said seat frame structure, for anchoring said wheeled chair to a stationary element fixed to a floor, said anchoring apparatus comprising:

a movable frame connected to said seat frame structure and movable in a vertical direction;

means for biasing said movable frame upwardly to retain said movable frame in a lifted position when said anchoring apparatus is in a released condition;

a foot pedal mechanism having a foot pedal connected to said seat frame structure to lower said movable frame when depressed by an attendant;

a locking mechanism mounted on said movable frame to be locked by engagement with said stationary element fixed to said floor when said movable frame has been lowered by depression of said foot pedal; and a releasing mechanism having an operation lever operatively connected to said locking mechanism to release engagement of said locking mechanism with said stationary element when operated by the attendant;

wherein said locking mechanism comprises a base plate secured to said movable frame, a detent plate pivoted at its central portion to said base plate, a locking lever pivoted at one end to said base plate, and a spring connected at its one end with a movable end of said detent plate and at its other end with a movable end of said locking lever to bias said detent plate and said locking lever in opposite rotational directions to one another, and wherein said detent plate is formed with a recessed portion and a hook portion to be engaged with said stationary element on the floor, and said locking lever is formed with a protrusion to be engaged with the recessed portion of said detent plate and is operatively connected to said operation lever.

15. An anchoring apparatus, for a wheeled chair having a seat frame structure, said anchoring apparatus comprising:

a movable frame connectable to said seat frame structure and movable in a vertical direction relative to said seat frame structure;

means for biasing said movable frame upwardly to retain said movable frame in a lifted position when said anchoring apparatus is in a released condition;

a foot pedal mechanism having a foot pedal connectable to said seat frame structure to lower said movable frame when depressed by an attendant;

a locking mechanism mounted on said movable frame to be locked by engagement with a stationary element fixed to a floor when said movable frame has been lowered by depression of said foot pedal;

a releasing mechanism having an operation lever operatively connected to said locking mechanism to release engagement of said locking mechanism with said stationary element when operated by said attendant;

a support frame connectable to said seat frame structure and located above said movable frame; and a link mechanism assembled with said support frame and said movable frame for carrying said movable frame thereon for vertical movement, wherein said support frame has a pair of laterally spaced first side members each of which is formed with an elongated guide slot at a position adjacent to its one end, and said movable frame has a pair of laterally spaced parallel second side members each of which is formed with an elongated guide slot at a position adjacent to its one end, and wherein said link mechanism includes a pair of laterally spaced first link members pivoted at their one ends to said other ends of said first side members and at their other ends to first support pins slidably engaged with said guide slots of said second side members and a pair of laterally spaced second link members pivoted at their one ends to said other ends of second side members and at their other ends to second support pins slidably engaged with said guide slots of said first side members, said first link members being pivoted to said second link members at their central portions, respectively; and wherein said movable frame may be displaced vertically with respect to said stationary element thereby allowing said locking mechanism to connectably engage said movable frame and said stationary element without contacting said seat frame structure.

16. An anchoring apparatus as claimed in claim 15, wherein said biasing means comprises a pair of laterally spaced dampers each having a cylinder and a piston rod, said cylinders being pivoted to the other ends of said first side members, and the piston rods being pivoted to the second support pins.

17. An anchoring apparatus, for a wheeled chair having a seat frame structure, said anchoring apparatus comprising:

a movable frame connectable to said seat frame structure and movable in a vertical direction relative to the seat frame structure;

means for biasing said movable frame upwardly to retain said movable frame in a lifted position when said anchoring apparatus is in a released condition;

a foot pedal mechanism having a foot pedal connectable to said seat frame structure to lower said movable frame when depressed by an attendant;

a locking mechanism mounted on said movable frame to be locked by engagement with a stationary element fixed to a floor when said movable frame has been lowered by depression of said foot pedal; and a releasing mechanism having an operation lever operatively connected to said locking mechanism to release engagement of said locking mechanism with said stationary element when operated by said attendant;

wherein said locking mechanism comprises a base plate secured to said movable frame, a detent plate pivoted at its central portion to said base plate, a locking lever pivoted at one end to said base plate, and a spring connected at its one end with a movable end of said detent plate and at its other end with a movable end of said locking lever to bias said detent plate and said locking lever in opposite rotational directions to one another, and wherein said detent plate is formed with a recessed portion and a hook portion to be engaged with said stationary element on said floor, and said locking lever is formed with a protrusion to be engaged with said recessed portion of said detent plate and is operatively connected to said operation lever; and wherein said movable frame may be displaced vertically with respect to said stationary element thereby allowing said locking mechanism to connectably engage said movable frame and said stationary element without contacting said seat frame structure.

18. A chair comprising:

a seat frame structure for supporting a seat; and an anchoring apparatus, attached to said seat frame structure, for anchoring said chair to a stationary element fixed to a floor, said anchoring apparatus further comprising:

a movable frame connected to said seat frame structure and movable in a vertical direction, with substantially no horizontal component of movement relative to said seat frame structure;

means for biasing said movable frame upwardly to retain said movable frame in a lifted position when said anchoring apparatus is in a released condition;

a foot pedal mechanism having a foot pedal connected to said seat frame structure to lower said movable frame when depressed by an attendant;

a locking mechanism mounted on said movable frame to be locked by engagement with said stationary element fixed to said floor when said movable frame has been lowered by depression of said foot pedal;

a releasing mechanism having an operation lever operatively connected to said locking mechanism to release engagement of said locking mechanism with said stationary element when operated by said attendant;

wherein said movable frame may be displaced vertically with respect to said stationary element thereby allowing said locking mechanism to connectably engage said movable frame and said stationary element without contacting said seat frame structure.

19. The chair as claimed in claim 18, wherein said anchoring apparatus further comprises:

a support frame mounted on said seat frame structure and located above said movable frame, and a link mechanism assembled with said support frame and said movable frame to carry said movable frame thereon for vertical movement.

20. The chair as claimed in claim 18, wherein said stationary element is a striker fixed to said floor.

21. The chair as claimed in claim 18, wherein said foot pedal is mounted on one end of a pedal arm pivotally carried by said movable frame at its intermediate portion and connectable at its other end to said seat frame structure.

22. A chair comprising;

a seat frame structure for supporting a seat;

an anchoring apparatus, attached to said seat frame structure, for anchoring said chair to a stationary element fixed to a floor said anchoring apparatus further comprising:

a movable frame connected to said seat frame structure and movable in a vertical direction;

means for biasing said movable frame upwardly to retain said movable frame in a lifted position when said anchoring apparatus is in a released condition;

a foot pedal mechanism having a foot pedal connected to said seat frame structure to lower said movable frame when depressed by an attendant;

a locking mechanism mounted on said movable frame to be locked by engagement with said stationary element fixed to said floor when said movable frame has been lowered by depression of said foot pedal;

a releasing mechanism having an operation lever operatively connected to said locking mechanism to release engagement of said locking mechanism with said stationary element when operated by said attendant;

a support frame mounted on said seat frame structure and located above said movable frame, and a link mechanism assembled with said support frame and said movable frame to carry said movable frame thereon for vertical movement, wherein said support frame has a pair of laterally spaced first side members each of which is formed with an elongated guide slot at a position adjacent to its one end and said movable frame has a pair of laterally spaced parallel second side members each of which is formed with an elongated guide slot at a position adjacent to its one end, and wherein said link mechanism includes a pair of laterally spaced first link members pivoted at their one ends to said other ends of said first side members and at their other ends to first support pins slidably engaged with said guide slots of said second side members and a pair of laterally spaced second link members pivoted at their one ends to said other ends of second side members and at their other ends to second support pins slidably engaged with said guide slots of said first side members, said first link members being pivoted to said second link members at their central portions respectively; and wherein said movable frame may be displaced vertically with respect to said stationary element thereby allowing said locking mechanism to connectably engage said movable frame and said stationary element without contacting said seat frame structure.

23. A chair comprising: a seat frame structure for supporting a seat;

an anchoring apparatus, attached to said seat frame structure, for anchoring said chair to a stationary element fixed to a floor, said anchoring apparatus further comprising:

a movable frame connected to said seat frame structure and movable in a vertical direction;

means for biasing said movable frame upwardly to retain said movable frame in a lifted position when said anchoring apparatus is in a released condition;

a foot pedal mechanism having a foot pedal connected to said seat frame structure to lower said movable frame when depressed by an attendant;

a locking mechanism mounted on said movable frame to be locked by engagement with said stationary element fixed to said floor when said movable frame has been lowered by depression of said foot pedal; and a releasing mechanism having an operation lever operatively connected to said locking mechanism to release engagement of said locking mechanism with said stationary element when operated by said attendant;

wherein said locking mechanism comprises a base plate secured to said movable frame, a detent plate pivoted at its central portion to said base plate, a locking lever pivoted at one end to said base plate, and a spring connected at its one end with a movable end of said detent plate and at its other end with a movable end of said locking lever to bias said detent plate and said locking lever in opposite rotational directions to one another, and wherein said detent plate is formed with a recessed portion and a hook portion to be engaged with said stationary element on said floor, and said locking lever is formed with a protrusion to be engaged with said recessed portion of said detent plate and is operatively connected to said operation lever; and wherein said movable frame may be displaced vertically with respect to said stationary element thereby allowing said locking mechanism to connectably engage said movable frame and said stationary element without contacting said seat frame structure.

* * * * *